US008130951B2

(12) United States Patent  (10) Patent No.: US 8,130,951 B2
Tian  (45) Date of Patent: Mar. 6, 2012

(54) INTELLIGENT ELECTRONIC DOCUMENT CONTENT PROCESSING

(75) Inventor: Lifen Tian, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 935 days.

(21) Appl. No.: 11/891,159

(22) Filed: Aug. 8, 2007

(65) Prior Publication Data

US 2009/0044254 A1   Feb. 12, 2009

(51) Int. Cl.
*G09C 3/08* (2006.01)
(52) U.S. Cl. ............... 380/51; 399/8; 399/81; 358/1.14; 358/1.18; 382/100; 283/902; 380/243; 726/20; 713/167; 235/432
(58) Field of Classification Search .................... 380/51, 380/243; 726/20; 399/8, 81; 358/1.18; 283/902; 713/167; 235/432
See application file for complete search history.

(56) References Cited

U.S. PATENT DOCUMENTS

| | | | | |
|---|---|---|---|---|
| 6,427,020 | B1* | 7/2002 | Rhoads | 382/100 |
| 6,651,975 | B2* | 11/2003 | Ohtsuka et al. | 271/145 |
| 7,054,483 | B2* | 5/2006 | Poynter | 382/162 |
| 7,408,658 | B2* | 8/2008 | Twede | 358/1.15 |
| 7,519,597 | B2* | 4/2009 | Kano | 1/1 |
| 7,770,220 | B2* | 8/2010 | Fernstrom | 726/20 |
| 2001/0014174 | A1* | 8/2001 | Yamamoto | 382/167 |
| 2002/0023227 | A1* | 2/2002 | Sheymov et al. | 713/201 |
| 2002/0135816 | A1* | 9/2002 | Ohwa | 358/474 |
| 2002/0196479 | A1* | 12/2002 | Simske | 358/474 |
| 2004/0111643 | A1* | 6/2004 | Farmer | 713/201 |
| 2005/0125673 | A1* | 6/2005 | Cheng et al. | 713/182 |
| 2005/0179937 | A1* | 8/2005 | Horihata | 358/1.15 |
| 2005/0219615 | A1* | 10/2005 | Silverbrook et al. | 358/1.15 |
| 2006/0100990 | A1* | 5/2006 | Aaron | 707/3 |
| 2007/0165248 | A1* | 7/2007 | Utsunomiya et al. | 358/1.1 |
| 2007/0174252 | A1* | 7/2007 | Rawlings et al. | 707/3 |
| 2008/0168135 | A1* | 7/2008 | Redlich et al. | 709/204 |
| 2008/0201172 | A1* | 8/2008 | McNamar | 705/3 |
| 2009/0254572 | A1* | 10/2009 | Redlich et al. | 707/10 |

* cited by examiner

*Primary Examiner* — April Shan
(74) *Attorney, Agent, or Firm* — Hickman Palermo Truong & Becker LLP; Edward A. Becker

(57) ABSTRACT

A network device includes a content processing module that is configured to perform intelligent document content processing, such as confidential information processing, content optimization and workflow optimization. The network device authenticates a user and determines electronic document data that is to be processed. The electronic document data may be created at the network device, e.g., by a scanning module on the network device, or at a client device, e.g., by a word processing application executing on the client device. The content processing module retrieves particular user preference data based upon the user authentication. The particular user preference data may specify confidential information preferences, content optimization preferences and/or workflow preferences. The content processing module performs intelligent document content processing on the electronic document data based upon the particular user preference data and generates processed electronic document data.

22 Claims, 7 Drawing Sheets

USER PREFERENCE DATA

CONFIDENTIAL INFORMATION PREFERENCE DATA 302

| FIELD | ACTION |
|---|---|
| Social Security Number (SSN) | Hide |
| Date of Birth (DOB) | Hide |
| Credit Card Number | Replace with 123456789 |
| User Defined Field | Hide |

CONTENT OPTIMIZATION PREFERENCE DATA 304

| FIELD | ACTION |
|---|---|
| Print Background Color | On |
| Print Background Image | On |
| Automatic Color Tuning | Off |
| User Defined Field | Off |

WORKFLOW PREFERENCE DATA 306

| FIELD | ACTION |
|---|---|
| Save Important Documents to Document Server | On |
| Email Important Marketing Documents to All Members of Marketing Department | On |

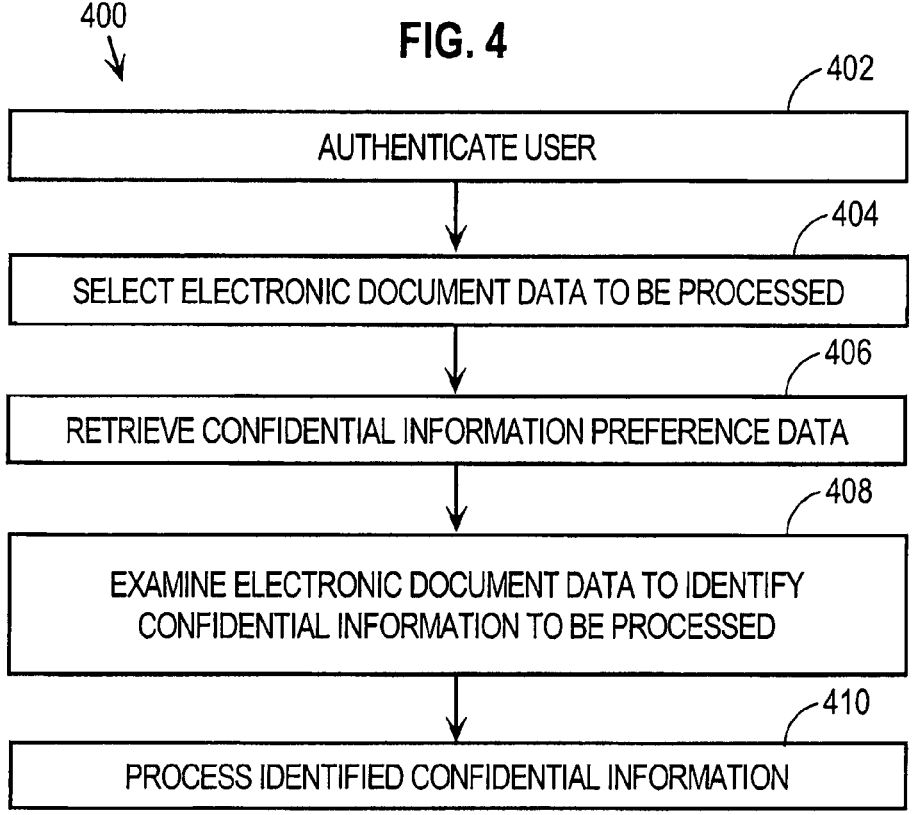
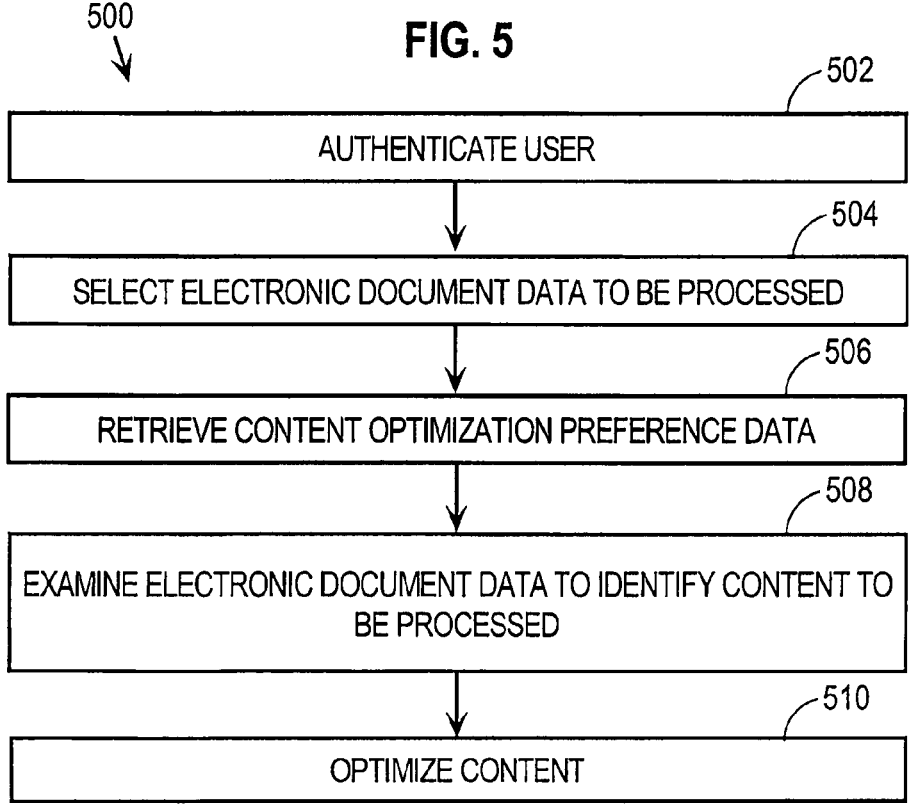

INTELLIGENT ELECTRONIC DOCUMENT CONTENT PROCESSING

FIELD OF THE INVENTION

This invention relates generally to electronic document processing on network devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Conventional image forming devices, such as printers, copiers, facsimile machines and multi-function peripheral (MFP) devices have inherent limitations relating to security and content optimization. For example, with respect to security, image forming devices conventionally process entire pages of printed documents, even if particular pages of documents contain sensitive information, such as social security numbers, dates of birth or credit card numbers. To the extent that security measures are implemented, it is usually done at the device or user level. For example, a device may be configured to disallow certain functionality. As another example, only certain users may be authorized to use particular devices, or particular functions of devices. User-level authorization is conventionally enforced by authenticating users using an identification card, RFID tag, or a user entering an identification and password into a operation panel of a device. With respect to content optimization, conventional image forming devices process a document without any content optimization. For example, conventional image forming devices do not consider whether the foreground or background color of a document matches the print paper color or whether the background color dominates the foreground contents, making the foreground contents unreadable. Based upon the foregoing, an approach for processing documents at image forming devices that does not suffer from the limitations of conventional image forming devices is highly desirable.

SUMMARY

A network device includes a content processing module that is configured to perform intelligent document content processing. The network device may be a scanner, printer, facsimile device or MFP, or any other type of network device, such as a server. The intelligent document content processing may include confidential information processing, content optimization and workflow optimization, or any combination thereof. To perform intelligent document content processing, the network device first authenticates a user, for example by verifying a user ID and password entered into an operation panel on the network device, or by authenticating data read from an ID card, RFID tag, etc. The network device then determines electronic document data that is to be processed. The electronic document data may be created at the network device, e.g., by a scanning module on the network device that processed a printed electronic document and generated the electronic document data. The electronic document data may also be created at a client device, e.g., by a word processing application executing on a client device and transmitted to the network device. The content processing module retrieves particular user preference data from a plurality of user preference data based upon the user authentication performed by the network device. The particular user preference data may specify confidential information preferences, content optimization preferences, workflow preferences, or any combination thereof. The content processing module performs intelligent document content processing on the electronic document data based upon the particular user preference data and generates processed electronic document data. The confidential information processing, content optimization and workflow optimization processing are described in more detail hereinafter.

According to another aspect of the invention, a network device includes a user authentication module and a content processing module. The user authentication module is configured to authenticate user data received by the network device. The content processing module is configured to determine electronic document data to be processed. The content processing module is also configured to retrieve, from a plurality of user preference data based upon the user data, particular user preference data that specifies one or more confidential information preferences. The content processing module processes the electronic document data based upon the particular user preference data and generates processed electronic document data by removing confidential information from the electronic document data based upon the one or more confidential information preferences defined by the particular user preference data.

According to another aspect of the invention, a network device includes a user authentication module and a content processing module. The user authentication module is configured to authenticate user data received by the network device. The content processing module configured to determine electronic document data to be processed. The content processing module is also configured to retrieve, from a plurality of user preference data based upon the user data, particular user preference data that specifies one or more content optimization preferences. The content processing module processes the electronic document data based upon the particular user preference data and generates processed electronic document data by changing one or more values specified in the electronic document data based upon one or more content optimization preferences defined by the particular user preference data.

DESCRIPTION OF THE DRAWINGS

In the figures of the accompanying drawings like reference numerals refer to similar elements.

FIG. 3B is a block diagram that depicts example user preference data that may be specified, e.g., via user interface, according to one embodiment of the invention.

FIG. 4 is a flow diagram that depicts an approach for performing confidential information processing according to an embodiment of the invention.

FIG. 5 is a flow diagram that depicts an approach for performing content optimization according to an embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
    II. ELECTRONIC DOCUMENT PROCESSING ARCHITECTURE
    III. USER PREFERENCE DATA
    IV. CONFIDENTIAL INFORMATION PROCESSING
    V. CONTENT OPTIMIZATION
    VI. WORKFLOW OPTIMIZATION
    VII. IMPLEMENTATION MECHANISMS

I. Overview

A network device includes a content processing module that is configured to perform intelligent document content processing. The network device may be a scanner, printer, facsimile device or MFP, or any other type of network device, such as a server. The intelligent document content processing may include confidential information processing, content optimization and workflow optimization, or any combination thereof. To perform intelligent document content processing, the network device first authenticates a user, for example by verifying a user ID and password entered into an operation panel on the network device, or by authenticating data read from an ID card, RFID tag, etc. The network device then determines electronic document data that is to be processed. The electronic document data may be created at the network device, e.g., by a scanning module on the network device that processed a printed electronic document and generated the electronic document data. The electronic document data may also be created at a client device, e.g., by a word processing application executing on a client device and transmitted to the network device. The content processing module retrieves particular user preference data from a plurality of user preference data based upon the user authentication performed by the network device. The particular user preference data may specify confidential information preferences, content optimization preferences, workflow preferences, or any combination thereof. The content processing module performs intelligent document content processing on the electronic document data based upon the particular user preference data and generates processed electronic document data. The confidential information processing, content optimization and workflow optimization processing are described in more detail hereinafter.

II. Electronic Document Processing Architecture

Figure 1:
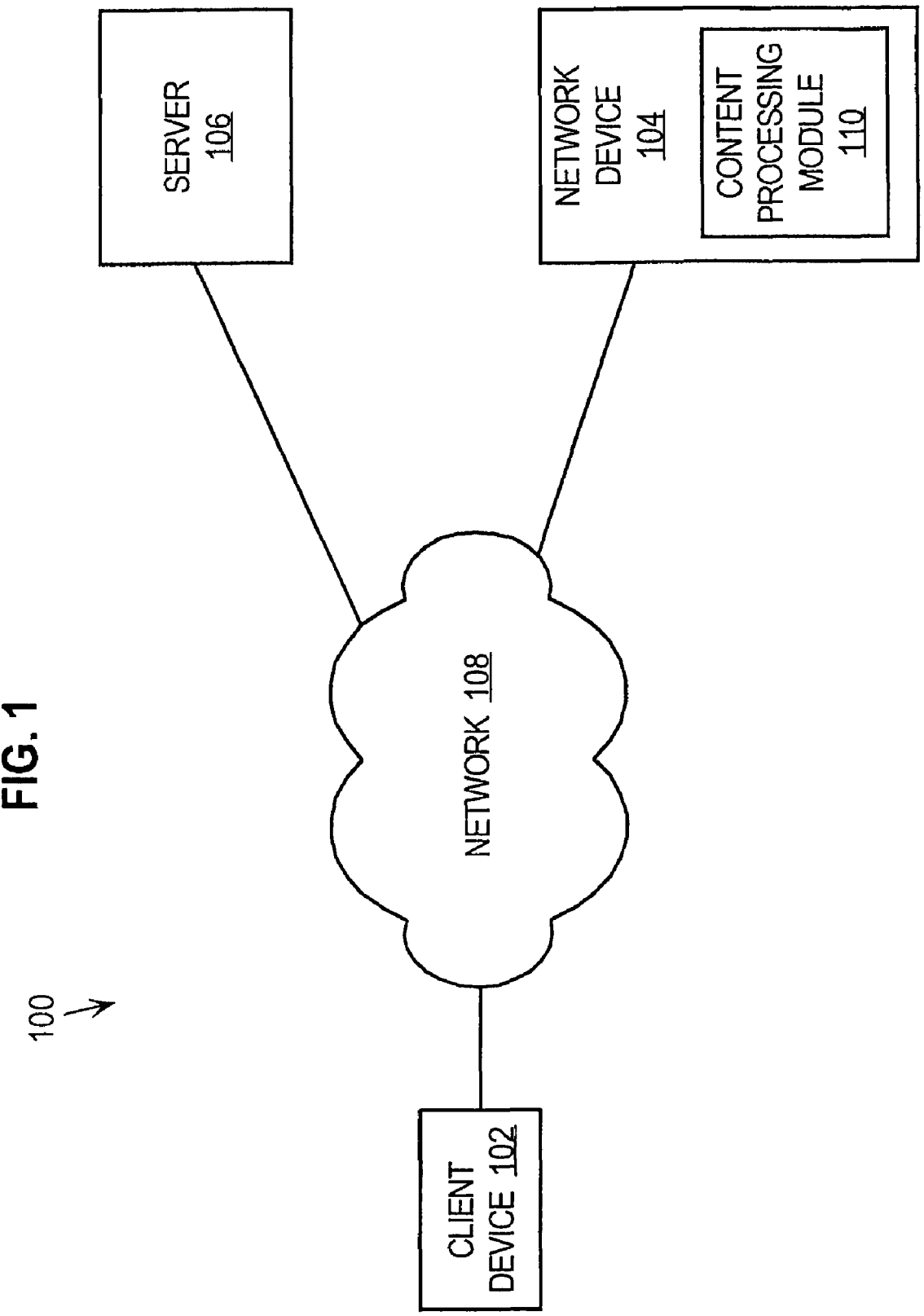
FIG. 1 is a block diagram that depicts an example arrangement in which electronic document processing may be implemented, according to an embodiment of the invention.

FIG. 1 is a block diagram that depicts an example arrangement 100 in which electronic document processing may be implemented, according to an embodiment of the invention. Arrangement 100 includes a client device 102 that is communicatively coupled to a network device 104 and a server 106 via a network 108. Network 108 may be implemented by any medium or mechanism that provides for the exchange of data between the various elements depicted in FIG. 1. Examples of network 108 include, without limitation, a network such as a Local Area Network (LAN), Wide Area Network (WAN), Ethernet or the Internet, or one or more terrestrial, satellite or wireless links. Network 108 may also provide for secure communications between the various elements depicted in FIG. 1. The various elements depicted in FIG. 1 may also communicate via one or more direct communications links that are not depicted in FIG. 1 or described herein for purposes of brevity.

Client device 102 may be any type of client device. Examples of client device 102 include, without limitation, a personal computer (desktop or laptop), a workstation, a personal digital assistant (PDA), a mobile device and a cellular telephone. Server 106 may be any type of server. Examples of server 106 include, without limitation, a file server and a Web server.

Figure 2:
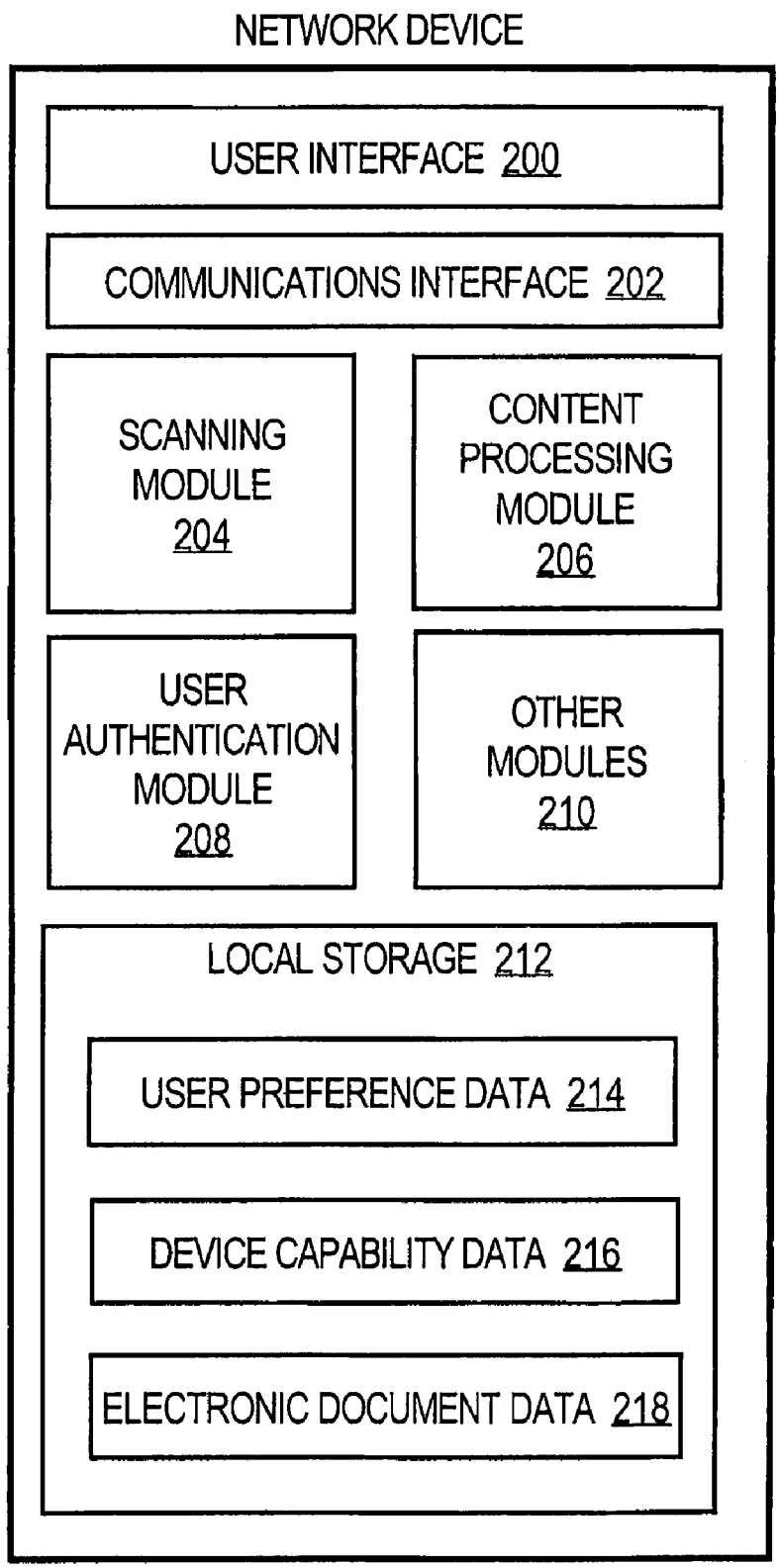
FIG. 2 is a block diagram that depicts an example embodiment of a network device.

Network device 104 may be any type of network device. Examples of network device 104 include, without limitation, a scanner, a printer, a facsimile machine, a copier and an MFP. FIG. 2 is a block diagram that depicts an example embodiment of network device 104. In this example, network device 104 includes a user interface 200, a communications interface 202, a scanning module 204, a content processing module 206, other modules 210 and local storage 212. Network device 104 may include any number of other elements and processes, depending upon a particular implementation, and the approach described herein is not limited to any particular elements and processes.

User interface 200 may be implemented by any mechanisms and/or processes that allow for the exchange of information between network device 104 and users. Examples of user interface 200 include, without limitation, a display, such as a cathode ray tube (CRT) or liquid crystal display (LCD), and an input device, such as a keypad, touchpad, touch screen, keyboard or mouse, or any combination of displays and input devices. Communications interface 202 may be implemented by any mechanism that allows for the exchange of data between network device 104 and other elements over network 108. One non-limiting example of communications interface 202 is a wired or wireless network interface card.

Scanning module 204 may be implemented by any mechanism capable of scanning printed documents and generating electronic document data that reflects the printed documents. Content processing module 206 is configured to process electronic document data 218 based upon user preference data 214 and generate processed electronic document data. User authentication module 208 may be implemented by any combination of hardware and software elements to perform user authentication. For example, user authentication module 208 may include a process configured to authenticate a user ID and password entered into network device 104 via user interface 200 or via an identification card, smartcard or RFID tag read by network device 104. Many other implementations of user authentication module 208 are possible, depending upon a particular implementation. Other modules 210 may include, for example, a printing module that is configured to process print data received by the network device and generate a printed document reflected in the print data.

Local storage 212 may be implemented by any type of storage. Examples of local storage 212 include, without limitation, volatile memory, such as random access memory (RAM) and non-volatile storage, such as one or more disks or flash memory. In the present example, local storage 212 stores user preference data 214, device capability data 216 and electronic document data 218. User preference data 214, device capability data 216 and electronic document data 218 may be stored in local storage 212 in any format. Network device 104 may include other mechanisms, modules, processes, etc., depending upon a particular implementation, that are not depicted in FIG. 2 or described herein for purposes of explanation.

III. User Preference Data

User preference data 214 is used by the content processing module 206 to perform intelligent document content processing on electronic document data 218. According to one embodiment of the invention, user preference data 214 may include data for one or more users and user preference data 214 for each user may include confidential information preferences data, content optimization preferences data and workflow preferences data. Each user preference data I through N may include different types and/or amounts of user preference data and may include user preference data other than the confidential information preference data 302, content optimization preference data 304 and workflow preference data 306 described herein. User preference data may not only be specific to a particular network device, but also may be specified for each function, service or process on a network device. For example, user preference data may include user preferences for each specific function, e.g., scanning, printing, copying, etc.

Figure 3A:
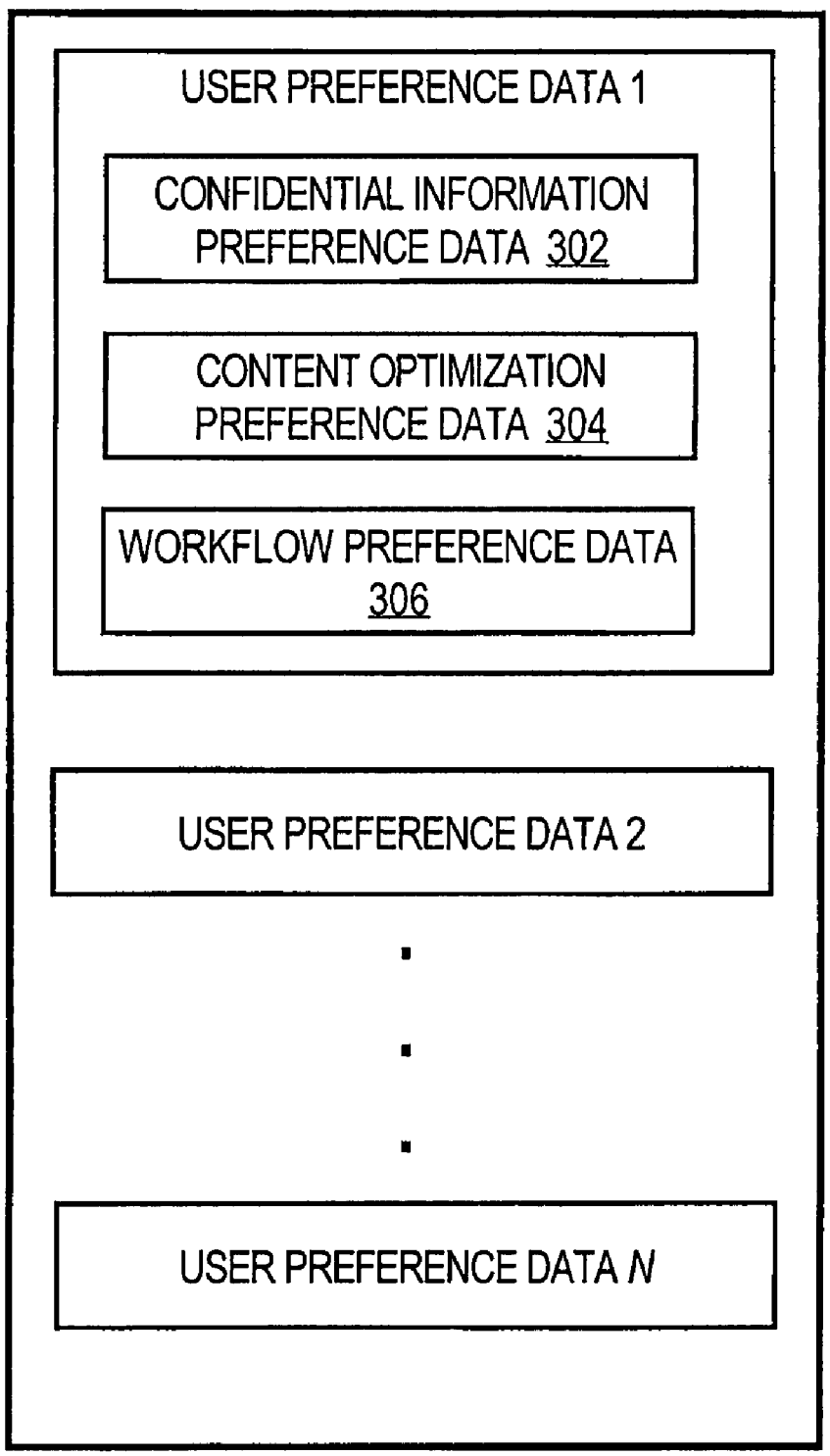
FIG. 3A is a block diagram that depicts example user preference data according to one embodiment of the invention.

FIG. 3A is a block diagram that depicts example user preference data 214 according to one embodiment of the invention. In this example embodiment, user preference data 214 includes user preference data 1 through user preference data N, each of which may correspond to a user or a logical group, such as a group of users, a department in a business organization, a work project, etc. In this example, use preference data 1 includes confidential information preference data 302, content optimization preference data 304 and workflow preference data 306.

Confidential information preference data 302 includes data that indicates one or more user preferences relating to how to process confidential information contained in electronic document data 218. The data contained in confidential information preference data 302 indicates the types of data that are considered to be confidential information and the actions that are to be taken to remove, replace, or otherwise render unreadable, confidential information contained in electronic document data 218. For example, confidential information preference data 302 may specify that social security numbers, dates of birth, credit card numbers, addresses, phone numbers, or any combination of the foregoing, are considered confidential information. The actions to be performed may include removing, replacing or otherwise rendering the confidential information unreadable.

FIG. 3B is a block diagram that depicts example user preference data 214 that may be specified, e.g., via user interface 200, according to one embodiment of the invention. In this example, confidential information preference data 302 includes a set of fields that include social security number, date of birth, credit card number and a user defined field and a corresponding action for each field, such as hide or replace with a dummy number. The example fields and corresponding actions are provided as examples and are not meant to represent all possible fields and actions. Any number and type of fields and corresponding actions may be provided, including any number of user defined fields that are specified or customized by a user.

Content optimization preference data 304 includes data that indicates one or more user preferences relating to optimizing the content of electronic document data 218. The data contained in content optimization preference data 304 indicates particular content and a corresponding action to be taken on the particular content. For example, in FIG. 3B, content optimization preference data 304 includes several fields, such as print background color, print background image and automatic color tuning and corresponding actions. Content optimization preference data 304 may also include any number of user defined fields and corresponding actions. As with confidential information preference data 302, content optimization preference data 304 may include any number and type of fields and corresponding actions, including any number of user defined fields that are specified or customized by a user.

Workflow preference data 306 includes data that indicates one or more user preferences relating to optimizing the workflow processing of electronic document data 218. The data contained in workflow preference data 306 indicates a set of workflow functions and whether each workflow function should be implemented. For example, in FIG. 3B, workflow preference data 306 includes two fields that include saving important documents to a document server and emailing important marketing documents to all members of the marketing department and two corresponding actions which, in the present example, indicate that both workflow functions should be implemented. Workflow preferences may be specific to users and functions. For example, the saving of electronic document data 218 to server 106 may apply to electronic document data 218 generated by the scanning module 204, but not to electronic document data 218 received by network device 104 from another network device.

Although user preference data 214 is depicted in the figures and described herein in the context of being organized on a per user basis, the invention is not limited to this context and user preference data 214 may be organized and formatted in any manner, depending upon a particular implementation. For example, user preference data 214 may be organized by data type. That is, the confidential information preference data for all users may be stored together. Similarly, the content optimization preference data for all users may be stored together and the workflow preference data for all users may be stored together. User preference data 214 may be stored on local storage 212 in any type of data structure or file structure. User preference data 214 may also include general user preference data that is used by content processing module 206 for all users.

User preference data 214 may be generated using a wide variety of techniques, depending upon a particular implementation. For example, a user may enter user preference data and/or specify user preferences at network device 104 via user interface 200. As another example, user preference data 214 may be generated by a user remotely on client device 102, e.g., via a word processor, and then transmitted to network device 104.

IV. Confidential Information Processing

According to one embodiment of the invention, the content processing module 206 is configured to perform confidential information processing. Confidential information processing generally involves processing electronic document data 218 to remove, replace, or otherwise render unreadable, confidential information contained in electronic document data 218. FIG. 4 is a flow diagram 400 that depicts an approach for performing confidential information processing according to an embodiment of the invention. In step 402, a user is authenticated. This may include, for example, verifying a user ID and password entered by a user via user interface 200, or received from an ID card, smartcard or RFID tag.

In step 404, particular electronic document data is selected for processing. In some situations, the particular electronic document data is automatically determined based upon the particular processing that occurs. Content processing module 206 may be configured to process electronic document data when it is generated. For example, content processing module 206 may automatically process electronic document data 218 as soon as a printed document is scanned and scanning module 204 generates the electronic document data 218. As another example, content processing module 206 may be configured to process electronic document data as soon as it is received by network device 104 from another network device, such as client device 102. Alternatively, content processing module 206 may process electronic document data 218 stored on local storage 212 that was previously generated by network device 104 or received by network device 104 from another network device. As yet another example, electronic document data 218 may have been previously generated and stored on network device 104 using locked printing and is processed by content processing module 206 when the electronic document data 218 is unlocked.

In step 406, particular confidential information preference data is retrieved from confidential information preference data 302 based upon the user authentication that was performed and optionally based upon the particular service being used. For example, suppose that a particular user is authenticated and then scans a printed document at network device 104. The confidential information preference data 302 associated with the particular user is used to process the electronic document data 218 generated by scanning module 204 when the printed document is scanned. Alternatively, the particular confidential information preference data may be retrieved from confidential information preference data 302 based upon user identification data contained in electronic device data 218. In step 408, the selected electronic document data is examined to identify confidential information to be processed, as defined by the retrieved confidential information preference data 302. Any type of technique may be used to identify the confidential information that is to be processed. For example, any type of text searching or pattern matching may be used to identify confidential information contained in the particular electronic document data. This may include, for example, searching for particular text strings, such as "social security number", numbers in the form of "XXX-XX-XXXX", "Date of Birth", "DOB" or numbers in the form of "XX-XX-XX" or "XX-XX-XXXX". These are just a few examples of the types of text searches that might be performed to identify confidential information and the invention is not limited to these examples. Image data that is suspected to contain confidential information may be replaced with other image data. For example, optical character recognition (OCR) may be used to convert image data to text. The text may then be examined to determine whether the text contains any confidential information. Other heuristics may be used to evaluate image data to determine the likelihood of the image data containing confidential information. The particular technique employed may vary depending upon a wide variety of factors, such as the sophistication of network device 104 and the form of electronic document data 218, e.g., text data or rasterized data.

In step 410, the identified confidential information is processed. This may include performing one or more actions indicated by the confidential information preference data 302, such as deleting the identified confidential information or hiding the identified confidential information by replacing the identified confidential information with replacement information. For example, a social security number, date of birth, credit card number or other confidential information may be replaced with dummy information, such as "XXX-XX-XXXX" for a social security number. Identified confidential information in text or in image data may also be replaced with replacement image data. For example, a social security number may be replaced with image data that indicates that confidential information has been removed. The replacement image data may also specify the name of a company. For example, the replacement image may include a company logo and state "Company ABC Confidential". According to one embodiment of the invention, both confidential text and a text field adjacent to or surrounding the confidential text are removed or replaced to provide a more natural appearance in the processed electronic document data. There may be situations where confidential information preference data 302 is generalized data that is intended for use on multiple network devices. Thus, there may be some confidential information preference data 302 that is ignored by content processing module 206 on a particular network device 104.

Numerous other types of confidential information processing may be performed. For example, confidential information processing may include establishing locked printing as a default processing mode for a user, in case the user forgets to specify locked printing for a particular document.

After the content processing module 206 performs confidential information processing as described herein, the content processing module 206 may perform content optimization and/or workflow optimization as described in more detail hereinafter.

V. Content Optimization

According to one embodiment of the invention, the content processing module 206 is configured to perform content optimization. Content optimization generally involves processing electronic document data 218 to compensate for color issues or other content issues. FIG. 5 is a flow diagram 500 that depicts an approach for performing content optimization according to an embodiment of the invention. In step 502, a user is authenticated. This may include, for example, verifying a user ID and password entered by a user via user interface 200, or received from an ID card, smartcard or RFID tag.

In step 504, particular electronic document data is selected for processing as previously described herein. In step 506, particular content optimization preference data is retrieved from content optimization preference data 304 based upon the user authentication that was performed and optionally based upon the particular service being used.

In step 508, the selected electronic document data is examined to identify content to be processed, as defined by the retrieved content optimization preference data 304, and in step 510, the identified content is processed. For example, content optimization preference data 304 may specify that color or black & white printing is to be used for certain types of files. One example is for PDF files to be printed in black & white and for HTML files to be printed in full color. The content optimization preference data 304 may also specify whether background color or a background image is to be printed. Various heuristics may also be used to provide automatic color tuning. For example, the background color may not be printed if the background color covers at least a threshold percentage, e.g., 80%, of a page. As another example, the background color may not be printed, or may be changed to a different color, if the background color is the same as, or close to, the color of the print paper. As yet another example, if the background color would dominate the foreground color when printed, the background color may not be printed or may be changed. Suppose that the print paper color is white, the foreground color is black and the background color is navy blue. In this situation, text printed in the foreground color of black may not be visible on the navy blue background color.

Therefore, the background color may not be printed to both save toner and allow the foreground color to be visible on the print paper color.

The same approach may also be used with background images where, for example, there is little color contrast between the foreground color in which text will be printed and the color of a background image. As another example, the foreground color may be changed, either alone or in combination with changing the color of the background or not printing the background. For example, suppose that both the background and foreground colors are light colors and there is very little contrast between them. In this situation, without any change, text printed in the foreground color may be difficult to read against the background. Therefore, the background color may not be printed and the foreground color changed to a darker color to provide adequate contrast against the color of the print paper. As another example, suppose that the print paper color is white, the background color is navy blue and the foreground color is white. In this situation, not printing the background color will save a substantial amount of toner, but the foreground color would not be visible against the white paper. Therefore, the foreground color is changed to a dark color, such as black.

Numerous other types of content optimization may be performed. For example, content optimization may include optimizing processing based upon available consumables. This may include using a different type of paper than originally specified because an insufficient amount of paper that was originally specified is available. Other examples of content optimization include changing page orientation, page resolution and collating documents. Many other types of content optimization are possible.

After the content processing module 206 performs content optimization as described herein, the content processing module 206 may perform workflow optimization as described in more detail hereinafter.

VI. Workflow Optimization

As previously described herein, workflow preference data 306 is data that specifies workflow actions to be taken when electronic document data is processed. For example, workflow preference data 306 may specify that after electronic document data 218 is processed at network device 104, e.g., after being generated or after an electronic document is printed at network device 104, that the electronic document data 218 is to be transmitted to server 106 for storage. As another example, workflow preference data 306 may specify that the electronic document data 218 is to be transmitted to client device 102, e.g., via email, or transmitted to another location via facsimile. As yet another example, workflow preference data 306 may specify that the electronic document data 218 is to be printed without the confidential information that was removed. The use of workflow preference data 306 in this manner can provide significant improvements in process workflow in a very user-friendly and convenient manner. It allows users to define additional processing that is to be automatically performed on various types of electronic document data 218 and may also vary depending upon how the electronic document data 218 was created. For example, a user may specify via their workflow preference data 306, that the electronic document data 218 generated by scanning a printed document at network device 104 is automatically stored to server 106, transmitted to his own client device 102 or any other combination.

VII. Implementation Mechanisms

Figure 6:
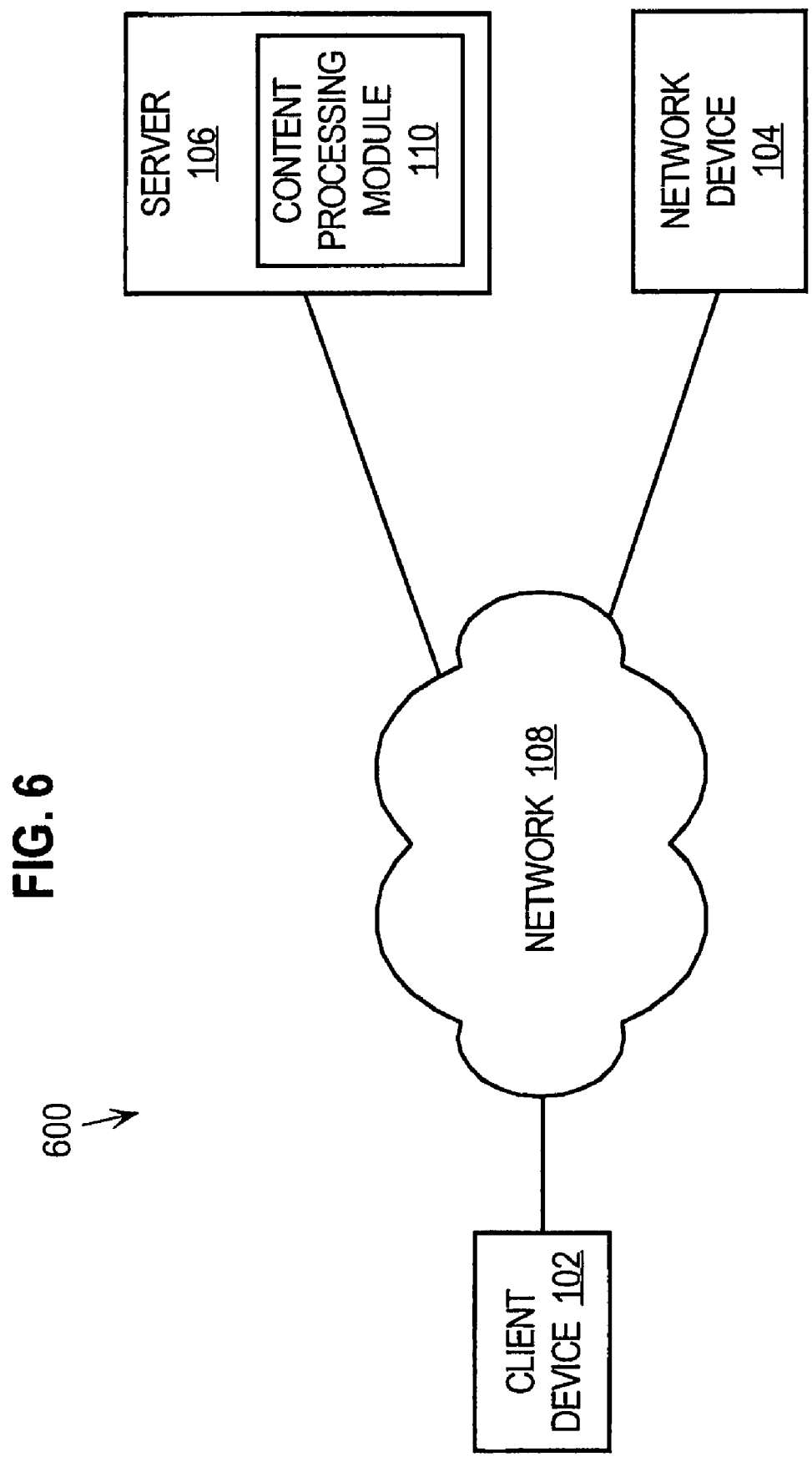
FIG. 6 is a block diagram of an arrangement that is similar to the arrangement of FIG. 1, except that content processing module is implemented on a server.

The approach for performing intelligent electronic document content processing may be implemented on any type of network device and the approach is not limited to any particular type of network device. Examples of network devices on which the approach may be implemented include, without limitation, printers, copiers, scanners, facsimile machines, multi-function peripheral devices and consumer electronics devices, such as PDAs, wireless devices, cell phones and cameras. In the context of a consumer electronic device, such as a camera, the approach may be used to provide translation services. For example, content optimization preference data 304 may specify that certain translations are to be performed for certain detected text or image data. This may include contacting server 106 or some other translation service over network 108. This is particularly helpful for translating maps or menus in foreign languages. The approach may also be implemented on a server. FIG. 6 is a block diagram of an arrangement 600 that is similar to the arrangement 100 of FIG. 1, except that content processing module 110 is implemented on server 106. In this example, the intelligent content process described herein is performed at server 106. Content processing module 110 may process electronic document data stored on serve 106. Network device 104 may also transmit electronic document data 218 to server 106 for processing by content processing module 110 and receive processed electronic document data back from server 106.

Although embodiments of the invention have been described herein in the context of content processing module 206 and user preference data 214 residing at the same location, e.g., on network device 104, the invention is not limited to this context. For example, user preference data 214 may be stored at a different location, such as server 106, and retrieved when necessary. This is particularly useful for mobile device implementations, because it allows users to move about and use different network devices with their own user preference data stored in a central location. As another example, user preference data 214 may be stored on local storage 212 and content processing module 206 implemented on server 106. Content processing module 206 then requests user preference data 214 from network device 104. There may also be more than one source for user preference data 214. For example, general user preference data 214 with general or default values may be stored on server 106 and specific or overridden values stored on network device 104.

Figure 7:
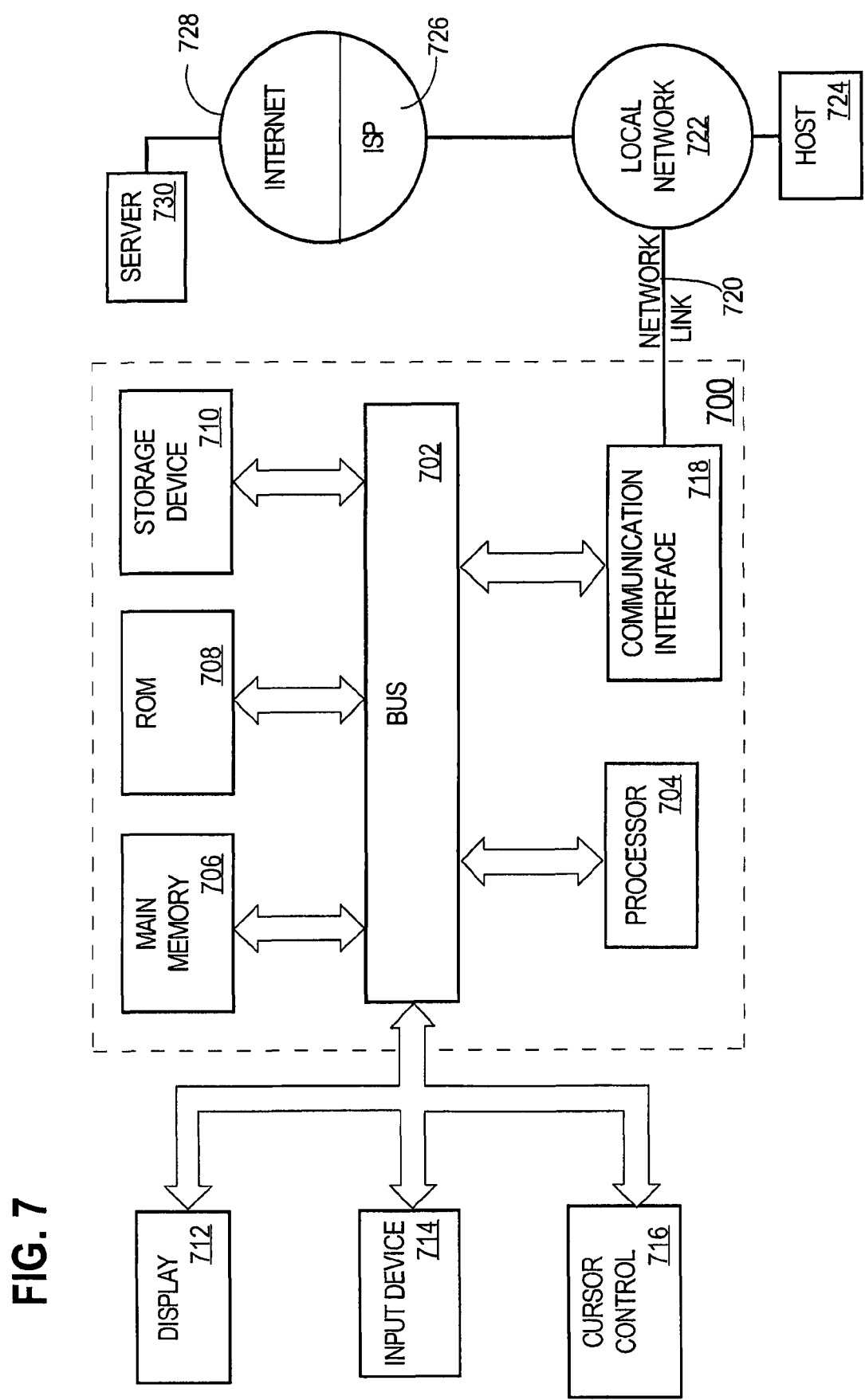
FIG. 7 is a block diagram of a computer system on which embodiments of the invention may be implemented.

Embodiments of the invention may be implemented on any type of computing platform or architecture. For purposes of explanation, FIG. 7 is a block diagram that depicts an example computer system 700 upon which embodiments of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 700, various computer-readable media are involved, for example, in providing instructions to processor 704 for execution. Such a medium may take many forms, including but not limited to, non-volatile media and volatile media. Non-volatile media includes, for example, optical or magnetic disks, such as storage device 710. Volatile media includes dynamic memory, such as main memory 706. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. An image forming device comprising:
   one or more processors; and
   a memory communicatively coupled to the one or more processors, the memory storing instructions which, when processed by the one or more processors, causes:
      authenticating user data received by the image forming device, wherein the user data corresponds to a particular user;
      determining electronic document data to be processed,
      retrieving, from a plurality of user preference data, particular user preference data that is specific to the user data and which specifies one or more types of confidential information and one or more actions to be performed on each type of confidential information,
      processing the electronic document data to identify, in the electronic document data, confidential information of one or more types that match the one or more types of confidential information specified by the particular user preference data that is specific to the user data and which specifies the one or more types of confidential information and the one or more actions to be performed on each type of confidential information, and
      automatically processing the electronic document data based upon the particular user preference data that is specific to the user data and which specifies the one or more types of confidential information and the one or more actions to be performed on each type of confidential information and generating processed electronic document data by removing, from the electronic document data, the confidential information having one or more types that match the one or more types of confidential information specified by the particular user preference data and additional information adjacent to the confidential information.

2. The image forming device recited in claim 1, wherein the instructions include additional instructions which, when processed by the one or more processors, causes adding to the processed electronic document data one or more of replacement text and image data to replace the confidential information removed from the electronic document data.

3. The image forming device recited in claim 1, wherein the instructions include additional instructions which, when processed by the one or more processors, causes removing from the electronic document data one or more text fields that contain the confidential information.

4. The image forming device recited in claim 1, wherein the plurality of user preference data is stored on the image forming device.

5. The image forming device recited in claim 1, wherein the plurality of user preference data is stored on a server and the retrieving of the particular user preference data includes the image forming device retrieving the particular user preference data from the server over a network.

6. The image forming device recited in claim 1, wherein:
the image forming device is a network scanning device, and
the network scanning device further comprises a hardware scanner configured to scan a printed document and generate electronic document data that reflects the printed document.

7. The image forming device recited in claim 1, wherein:
the image forming device is a printer, and
the printer further comprises a print processor configured to process print data received over a network and generate a printed version of an electronic document contained in the print data.

8. The image forming device recited in claim 1, wherein the instructions include additional instructions which, when processed by the one or more processors, causes, based upon workflow preference data contained in the user preference data, workflow optimization to be performed on the processed electronic document data.

9. The image forming device recited in claim 1, wherein the instructions include additional instructions which, when processed by the one or more processors, causes, based upon workflow preference data contained in the user preference data, the processed electronic document data to be one or more of stored on a server by transmitting the processed electronic document data from the image forming device to the server over a network, transmitted from the image forming device over the network to one or more other network devices and printed at the image forming device without the confidential information.

10. The image forming device as recited in claim 1, wherein:
the particular user preference data further specifies one or more content optimization preferences, and
the instructions include additional instructions which, when processed by the one or more processors, causes processing the electronic document data based upon the particular user preference data and generating the processed electronic document data by changing one or more of one or more color values and one or more consumable values of content of a type specified by the particular user preference data.

11. An image forming device comprising:
one or more processors; and
a memory communicatively coupled to the one or more processors, the memory storing instructions which, when processed by one or more processors, causes:
authenticating user data received by the image forming device, wherein the user data corresponds to a particular user;
determining electronic document data to be processed,
retrieving, from a plurality of user preference data, particular user preference data that is specific to the user data and which specifies one or more types of content and one or more actions to be performed on each type of content,
searching the electronic document data to identify, in the electronic document data, content of one or more types that match the one or more types of content specified by the particular user preference data that is specific to the user data and which specifies the one or more types of content and the one or more actions to be performed on each type of content, and
automatically processing the electronic document data based upon the particular user preference data that is specific to the user data and which specifies the one or more types of content and the one or more actions to be performed on each type of content and generate processed electronic document data by changing, in the electronic document data, one or more of one or more color values and one or more consumable values for one or more consumable resources of the content of one or more types that match the one or more types of content specified by the particular user preference data.

12. The image forming device recited in claim 11, wherein changing one or more color values includes one or more of changing a background color, changing a foreground color, changing the one or more color values in the electronic document data to improve a contrast between foreground text and a background color specified in the electronic document data, changing the one or more color values specified in the electronic document data so that no background color is printed and changing the one or more color values specified in the electronic document data so that no background color is printed and a foreground color is changed.

13. The image forming device recited in claim 11, wherein the instructions include additional instructions which, when processed by the one or more processors, causes comparing a background color value specified in the electronic document data to a color value of paper on which the electronic document data is to be printed.

14. The image forming device recited in claim 11, wherein the instructions include additional instructions which, when processed by the one or more processors, causes comparing a background color value specified in the electronic document data to a foreground color value specified in the electronic document data.

15. The image forming device recited in claim 11, wherein the instructions include additional instructions which, when processed by the one or more processors, causes examining the electronic document data to identify the one or more color values contained in the electronic document data.

16. The image forming device recited in claim 11, wherein the plurality of user preference data is stored on the image forming device.

17. The image forming device recited in claim 11, wherein the plurality of user preference data is stored on a server and the retrieving of the particular user preference data includes the image forming device retrieving the particular user preference data from the server over a network.

18. The image forming device recited in claim 11, wherein:
the image forming device is a network scanning device, and
the network scanning device further comprises a hardware scanner configured to scan a printed document and generate electronic document data that reflects the printed document.

19. The image forming device recited in claim 11, wherein:
the image forming device is a printer, and
the printer further comprises a print processor configured to process print data received over a network and generate a printed version of an electronic document contained in the print data.

20. The image forming device recited in claim 11, wherein the instructions include additional instructions which, when processed by the one or more processors, causes, based upon workflow preference data contained in the user preference data, workflow optimization to be performed on the processed electronic document data.

21. The image forming device recited in claim 11, wherein the instructions include additional instructions which, when processed by the one or more processors, causes, based upon workflow preference data contained in the user preference data, the processed electronic document data to be one or more of stored on a server by transmitting the processed electronic document data from the image forming device to the server over a network, transmitted from the image forming device over the network to one or more other image forming devices and printed at the image forming device without the confidential information.

22. The image forming device recited in claim 1, wherein the one or more actions include at least that each type of confidential information is to be removed from the electronic document data.

* * * * *